April 19, 1966 E. D. GRIM, JR 3,247,506

OPTICAL FIBER ANALOG-DIGITAL CONVERTER

Filed Oct. 26, 1962 3 Sheets-Sheet 1

INVENTOR.
EARL D. GRIM, JR.
BY John V. Regan
ATTORNEY

April 19, 1966 E. D. GRIM, JR 3,247,506

OPTICAL FIBER ANALOG-DIGITAL CONVERTER

Filed Oct. 26, 1962 3 Sheets-Sheet 2

INVENTOR
EARL D. GRIM, JR.

BY John V. Regan

ATTORNEY

April 19, 1966 E. D. GRIM, JR 3,247,506

OPTICAL FIBER ANALOG-DIGITAL CONVERTER

Filed Oct. 26, 1962 3 Sheets-Sheet 3

INVENTOR.
EARL D. GRIM, JR.
BY John V. Regan
ATTORNEY

United States Patent Office 3,247,506

Patented Apr. 19, 1966

3,247,506

OPTICAL FIBER ANALOG-DIGITAL CONVERTER

Earl D. Grim, Jr., Merchantville, N.J., assignor to Radio Corporation of America, a corporation of Delaware Filed Oct. 26, 1962, Ser. No. 233,356
6 Claims. (Cl. 340—347)

This invention relates to a fiber optical system for producing an output voltage which digitally represents the angular position of a shaft.

Apparatus for digitally producing the angular position of a shaft is known. Certain of such known apparatus uses a disk mounted on a shaft to rotate therewith about a common axis, the disk having a series of concentric code rings or tracks thereon. These code rings usually include an inner ring one-half of the circumferential length of which has one characteristic, as conductive or transparent, and the other half of the circumference of this track having the opposite characteristic, as non-conductive or opaque. A second track, concentric with and surrounding the first track, has four sectors of equal circumferential length, alternate ones of which have the appropriate opposite characteristics. Further rings, having successively greater number of sectors of equal size, alternate ones of which have the said appropriate opposite characteristics, surround the second ring. As many concentric rings of sectors may be provided as is convenient, each ring (except the first) having twice as many sectors as another ring on the code disk, the ring with the higher number of sectors surrounding the rings with the lesser number of sectors. Usually, the sectors are so positioned in their respective rings that at least one radial line exists that coincides with a boundary between sectors in all the rings. If the ring with the most sectors is considered to correspond to the least significant digit position in a binary digital number (2° place), the ring with one-half that many sectors will correspond to the second significant digit (first power of two place) and the rings with successively less sectors will correspond to successively more significant digital positions (higher powers of two). If conductive and non-conductive segments are used, all the conductive segments may be connected to a source of potential. A plurality of brushes may be provided on a fixed radial line, in such manner that one brush contacts the adjacent sector of a ring thereof, whether the sector be conductive or non-conductive. The potential on the brushes are an indication of the angular position of the disk, and therefore of the shaft on which it is mounted, in the binary system of integers, to as many places (or bits) as there are code rings on the code disk. Similarly, a radially extending, narrow line of light on one side of a code disk in which the alternate sectors are respectively transparent and opaque, produces a light pattern which is an indication in the binary code of the angular position of the disk.

When one line of brushes is used, if the pattern of sectors and the radial lining up of brushes is not perfect, an ambiguous indication of the angular position of the disk may be produced as the disk rotates. For example, where the binary indication is changed from 01111 (15) to 10000 (16), if the sector of the ring of sectors corresponding to the highest power of two contacts its brush before the other sectors break contact with their respective brushes, an incorrect indication of 11111 (31) will be given.

Indicating systems with means for preventing such incorrect indications are known. One such error avoiding system uses a binary code, called the Grey Code, which is not the natural binary code. Use of this system involves changing the Grey Code to the natural code. Another error avoiding system is known as the V-scan system. In this system, one brush is used for the units position of the binary indication and a pair of brushes spaced equal distances on each side of a radial line through the units position brush are provided for each of the other ring of sectors of the code disk. The circumferential distance between the brushes may be equal to one-half the circumferential length of a sector of the ring to which the brush is applied, or the distance between the brushes of a pair thereof may be equal to the circumferential length of a digit in the ring corresponding to the zero power of two, or the distance between such brushes may have any intermediate value. The brushes of the pairs thereof in the direction of higher count from the radial line are called the leading brushes and the other brushes of the pair thereof are called the lagging brushes. In the V-scan system, when the value of one appears in any given track or ring, the indication given by the lagging brush of the next higher value track is read. Therefore, where the units brush has a potential corresponding to one thereon, the lagging brush of the next inner ring is connected to the digital position indicator output. If the units brush has no potential, which corresponds to zero, then the leading brush of the next inner ring is connected to the output. A similar selection of leading and lagging brushes takes place for the further rings or tracks. As noted, the V-scan system avoids errors due to inaccurate scanning patterns and due to inaccurate alignment of brushes with respect thereto, except in the zero power of two position.

However, the brush type of indicator involves sliding contacts which are noisy, which wear and require lubrication and which require power to overcome the friction created by the brushes contacting the coded disks. The prior art optical indicators which utilize conventional optical systems, require a considerable amount of energy to supply the light sources, are rather large and heavy, and are rather complex, particularly when used with the V-scan system of producing non-ambiguous outputs.

It is therefore an object of this invention to provide an improved device for producing an unambiguous natural binary indication of an analog position.

It is an object of the invention to provide a device for producing an unambiguous natural binary indication of an analog position and avoiding the use of brushes or conventional optical systems.

It is another object of this invention to provide such a device of reduced size and weight and complexity and of greater reliability and having relative freedom from wear compared to devices using brushes.

One device, according to this invention, includes a thin movable disk or sheet having a code pattern of rings or tracks of opaque and transparent sectors thereon. Light is gathered from a light source and projected by the ends of fiber optical bundles on the patterns at one position on the track or ring corresponding to the zero power of two and to two properly selected positions on the tracks corresponding to the indication of the first and higher powers of two. Photosensitive elements or photosensors such as photo diodes or photo resistors are positioned on the opposite side of the code disk or sheet from the ends of the fiber optical bundles. The electrical outputs of the photosensors is applied to electronic circuits which give unambiguous, digital indications in natural binary code of the position of the pattern with respect to the adjacent ends of the light bundles and photosensors. If desired, fiber optical pickup bundles may be inserted between the disk and photosensors. The fiber optical bundles may be used to achieve optimum positioning of the photosensors by permitting bends and twists in the light paths difficult or impossible to achieve with conventional optics.

This invention is more fully explained in the following detailed description thereof, taken with the accompanying drawing in which.

Fiber optical bundles, used in the device of this disclosure for carrying light from light sources and to photosensors, comprise a plurality of fine filaments of glass of circular cross section and of high index of refraction surrounded by thin jackets of glass of lower index of refraction, laid more or less parallel in a plastic matrix, such as epoxy resin. Each bundle of filaments with its matrix has ends cut in a plane transverse to the filament axes and optically polished. Light applied to one end of a bundle is projected to the other end thereof. The ends of the bundles may have any convenient shape. The input ends may be round to pick up light from a light source and the output ends may have the same configuration but of slightly smaller size than a code sector of the outer ring of a code disk. The fiber optical bundles may be bent or twisted with substantially no loss of efficiency of light transfer therethrough.

Figures 4, 5, 6:
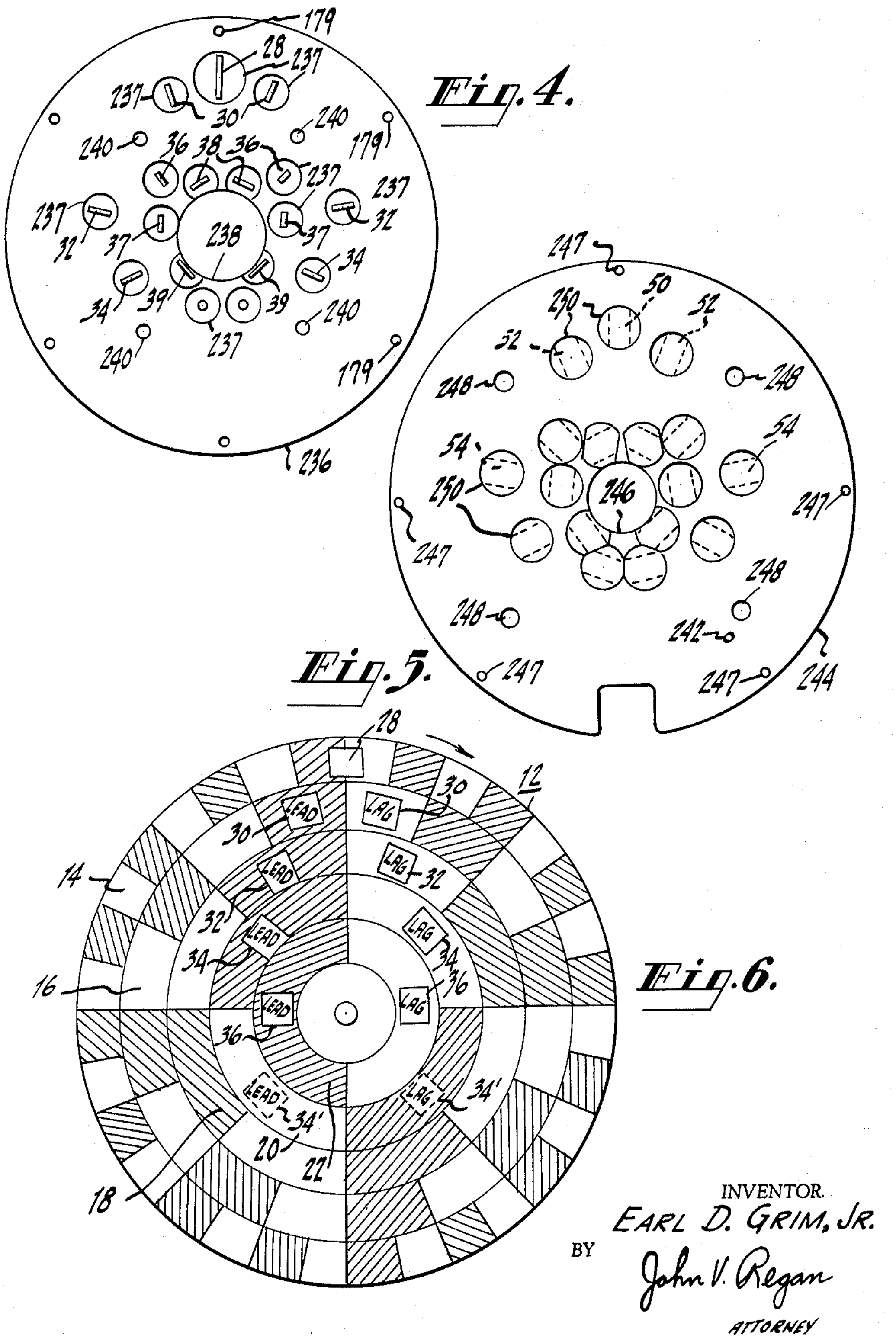
FIG. 6 is a diagrammatic showing of a code disk and also showing the positions of fiber optical bundle ends used in the device of this invention.

A code disk 12, useful in the herein described device is shown in FIG. 6. The code pattern presented by this code disk 12 comprises a plurality (here shown as 5) of concentric rings or tracks 14, 16, 18, 20 and 22, the center track 22 having only two sectors, one transparent and the other opaque. The next track 20 has four sectors, two transparent and two opaque, the transparent and opaque sectors being alternately positioned around the circumference of the ring or track. Each successive track 18, 16 and 14 has twice as many opaque and transparent sectors, alternately positioned, as a previous track. The sectors are so arranged that a diameter or fiducial line exists which bounds one transparent sector in each ring. While only five rings are shown in FIG. 6, as many rings may be provided as is convenient. As will be more fully described below, the code disk used in the encoder device of FIG. 1 may have 7, 8, 9 or more rings. The outermost ring 14 corresponds to two to the zero power digit of natural binary numbers and the next successive rings 16, 18, 20 and 22 correspond respectively to the digits expressing the next successively higher powers of two. The indication of the position of a shaft 24 on which the disk is mounted is provided by the light pattern resulting when light is applied to one side of the code disk or wheel on the code rings. This light is projected on the code rings of code wheel 12 (FIGS. 1 and 7) by fiber optical bundles 27, 29, 31. A fiber optical bundle is arranged so that a rectangular end face 28 (FIG. 6) thereof is adjacent to the outside code ring, which has the most segments thereon. Pairs of fiber optical bundles are so arranged that a rectangular end face 30, 30, 32, 32, 34, 34, and 36, 36 of each bundle of a pair thereof is adjacent to a ring. The radially outermost bundle face 28 is positioned on a radial line to project light from lamp 40 (FIG. 7, not shown in FIG. 1) on the outer code ring 14, and each successive pair of other bundles are positioned symmetrically with respect to said radial line and the bundle faces 30, 30, for example, of a pair are placed equidistant from this line and apart different distances for different pairs, increasing with digital significance. However, if for any reason, such as space requirements, a pair of rectangular faces, such as bundle faces 34, 34 are not positioned to illuminate their respective sectors and the rectangular faces 34, 34 are spaced so far apart that they illuminate next adjacent sectors of the ring to which they are applied, as shown in FIG. 6 at 34', 34', then the photosensors that are illuminated through the coded wheels will give a complementary output, as will be explained below.

It may be desirable to so position the photosensor 50, 52, 52 and 54, 54 (FIG. 7) that the light from the above-described fiber optical bundles 27, 29, 29, 31, 31 upon passing through the code disk 12, does not hit their respective photosensors. Further optical bundles 60, 62, 62, 64, 64 may be provided, positioned in one to one registry with the above-described optical bundles 27, 29, 29, 31, 31 and on the opposite side of the disk 12 therefrom. While not so shown in FIG. 7, the ends of the further bundles 60, 62, 62, 64, 64 adjacent the code disk 12 may be of the size and shape of the smallest code sector and the other ends of the further optical bundles 60, 62, 62, 64, 64 may be round in cross section and a bit smaller in diameter than the photosensor 50, 52, 52, 54, 54 on which they throw light. It will be understood that the further optical bundles 60, 62, 62, 64, 64 may be omitted, if the photosensors can be positioned so that they will receive light, through the code disk, directly from the first-described optical bundles 27, 29, 29, 31, 31 and in such a manner that each photosensor receives light from only one bundle of the remaining bundles, since applying light to one photosensor from more than one of the remaining bundles would cause erroneous readings.

Figure 7:
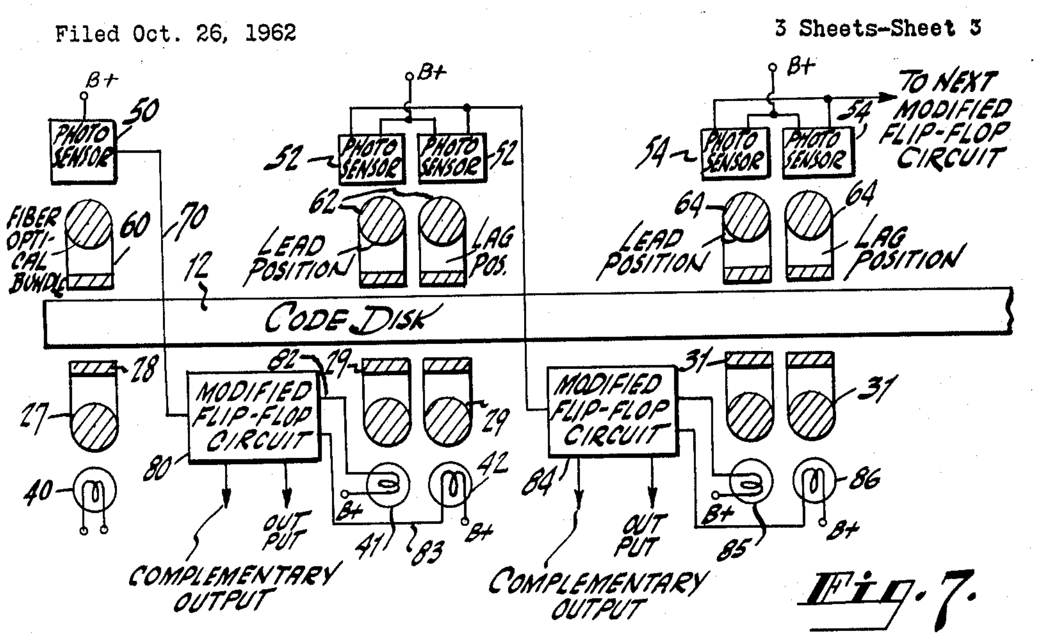
FIG. 7 is a diagram used to explain an embodiment of this invention.

FIG. 7 illustrates diagrammatically, the structure of the encoder device. In FIG. 7, the code disk 12 rotates about an axle or shaft 24 (not shown in FIG. 7) to the right as viewed in FIG. 7. As noted above, only two, cooperating optical bundles 27 and 60 are used with the outer ring which includes the most code sectors. Two pair of optical bundles 29, 29 and 62, 62; 31, 31 and 64, 64 are provided for each successive ring of sectors arranged as leading and lagging bundles, as noted above. If pictorially illustrated in FIG. 7, one only of each pair of leading and lagging bundles would show, since the other bundle would be behind the bundle illustrated. To avoid this difficulty of illustration, and for the purpose of explanation only, the leading and lagging bundles are so labeled and are shown as being radially arranged.

Light from lamp 40 is applied to the inlet end of the bundle 27 positioned adjacent the outer ring of sectors, and the light from the outlet end of the bundle 60 at the other side of the code disk 12 is applied to a photosensor 50. The light causes photosensor 50 to change its resistance and thereby apply a greater current flow through a conductor 70 to a dual output modified flip-flop circuit 80 which is described below. One output 82 of circuit 80 indicates a one and the other output 83 indicates the inverse or complement thereof, a zero, when a zero input is applied to the photosensor 50. The indications of the outputs 82 and 83 are reversed when a one input is applied to circuit 80. Each output circuit 82 and 83 of the modified flip-flop circuit 80 has a light bulb 41 and 42 connected in series therewith. The light from a bulb 41 or 42 is applied respectively to the input ends of fiber optical bundles 29, 29 whose output ends are adjacent the second circle of segments of the code disk 12. The bundles 62, 62 whose input ends are adjacent the other side of the code disk 12 are in registry with the output ends of bundles 29, 29 and apply light respectively to photosensors 52, 52 which are connected in parallel. Due to the operation of the modified flip-flop circuit 80 only one of the two lights 41 and 42 in the output circuits 82 and 83 is on at any one time. If any light is applied to photosensor 50 in the input circuit of the modified flip-flop circuit 80, the light 42 corresponding to the lagging position, is lit. If no light is applied to the photosensor 50, the light 41 corresponding to the leading position, is on. The outputs of the two photosensors 52, 52 are connected in parallel to a second modified flip-flop circuit 84 also having a light bulb 85 connected in series in one of its output connections and a further light bulb 86 connected in series in its other output connection. The circuit 84 has the properties given for the previous modified flip-flop circuit 80 that is, if either photosensor 52, 52 in its input is illuminated, the lamp 86 at the lagging position is on and if neither photosensor 52, 52 is illuminated, the lamp 85 at the leading position, is on. Each of these light bulbs 85 and 86 illuminates a respective input end of a fiber bundle 31, 31 whose outputs are adjacent the third ring of sectors. The output ends of the fiber bundles illuminate the respective ends of the fiber bundles 64, 64 whose ends are in registry therewith, and the output ends of bundles 64, 64 illuminate respective photosensor 54, 54 which are connected in parallel to the input of a further similar modified flip-flop circuit, not shown in FIG. 7. The above-described cascading of fiber bundles, photosensors, and modified flip-flop circuits having bulbs in the respective outputs thereof is continued until the pair of photosensors associated with the last coded ring and the modified flip-flop circuit controlled thereby is provided. The last modified flip-flop circuit may differ from the others thereof in that light bulbs need not be provided in the output connections thereof. Output signals and inverse output signals, that indicate the angular position of the shaft in natural binary code, are taken from the modified flip-flop circuit.

Figure 8:
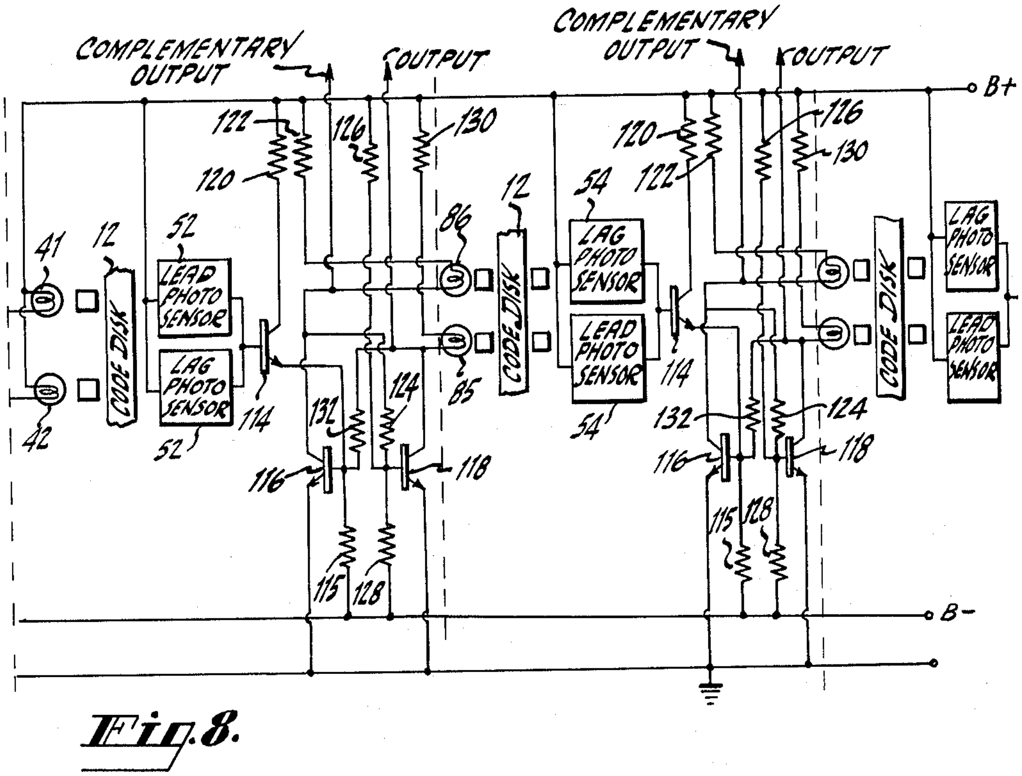
FIG. 8 is a circuit diagram of the embodiment of FIG. 1.

The circuit diagram of a modified flip-flop circuit that may be used in FIG. 7 is shown in FIG. 8. Each modified flip-flop circuit 80 and 84 of FIG. 7 comprises three NPN transistors 114, 116 and 118 (FIG. 8). The input to a modified flip-flop 80 or 84 is applied to the base of transistor 114 from the previous photosensor (there being one only connected to the input of the first modified flip-flop circuit 80) or from the paralleled output of a pair of photosensors (for all other stages). The collector of transistor 114 is connected to a source of direct potential which is positive with respect to ground through a resistor 120 and the emitter of transistor 114 is connected to the base of transistor 116. The base of transistor 116 is connected to a source of direct negative potential through resistor 115. The collector of transistor 116 is connected to a source of direct potential, which is positive with respect to ground, through the series combination of resistor 122 and a light bulb 86, and also through a resistor 124 to the base of third transistor 118. The emitter of transistor 116 is connected directly to ground. The base of transistor 118 is connected through resistor 126 to a direct potential source which is positive with respect to ground. The base of transistor 118 is also connected to a direct potential source which is negative with respect to ground through resistor 128. The emitter of transistor 118 is connected directly to ground. The collector of transistor 118 is connected through a series combination of resistor 130 and a lamp 85 to a source of direct potential which is positive with respect to ground, and also through a resistor 132 to the base of transistor 116.

The operation of the circuit of FIG. 8 is as follows: In its quiescent state, that is, when no signal is applied to either photosensor 52, the biases applied to the first two transistors 114 and 116 is such that they are non-conductive and the third transistor 118 is conductive. The voltage on the collector of transistor 118 is nearly zero, and current flows through the light 85 at the leading position causing this light to go on. If either of the two photosensors 52, 52 is illuminated through the code wheel, positive potential is applied to the base of first transistor 114 and positive voltage is applied to the base of the second transistor 116 through the first transistor 114 collector to emitter path. The second transistor 116 becomes conductive and the light 86 at the lagging position connected to the collector of the second transistor 116 is illuminated. At the same time, the voltage of the base of the third transistor 118 becomes more negative whereby the third transistor 118 becomes non-conductive and the light 85 connected to its collector goes out. In this manner, when no light shines on either photosensor in the output of any of the several modified flip-flop circuits, the output bulb in the leading position is lit and the bulb in the lagging position is off. When the light shines on either photosensor, the output bulb in the lagging position is on and the bulb in the leading position is off. Therefore, when the signal produced by a code ring is zero, the leading position of the next code ring is read and when the signal produced by any code ring is one, the lagging position of the next code ring is read. This is the required operation of a so-called V-scan. The bit output signals are taken from the collectors of the third transistors 118, a "zero" voltage being taken from the collector of the transistor 118 when neither photosensor is illuminated and a "one" voltage being taken from this collector when either one of the photosensor is illuminated. The complementary output (an indication of 1 as the complement of 0 and 0 as the complement of 1) may be taken from the collector of the second transistors 116.

Advantage may be taken of the fact that the apparatus herein described provides a complementary outputs as well as direct outputs. As noted above in connection with the description of FIG. 6, if there be insufficient space for placing the ends of the fiber optical bundles in their correct positions on their corresponding code rings, this correct position being diagrammatically illustrated at 34 in the fourth ring 20, these ends 34 of the fiber optical bundles may be moved along the code ring 20 a distance equal to the circumferential length of one code sector in that ring to the position 34′ shown in dotted lines, at the complementary position with the fiducial radial line. In this dotted position 34′, the condition of transparency or opacity of the sector of the code ring 20 is reversed from its previous condition, whereby the photosensors associated with that ring 20 are exposed to the complementary condition of illumination. Therefore, in inverting the connections of the outputs of the modified flip-flop circuit which is responsive to the fiber optical bundles in the complementary position 34′, correct outputs, as distinct from complementary outputs, may be taken from the circuit responsive to that code ring. The connections of the lamps applying light to the next code ring are also inverted.

As noted above, the fiber bundles leading light from the code wheel to the photosensors may be omitted from any encoder arrangement upon arranging the photodiodes so that light falls directly thereon, and so that no cross talk occurs between the sources of illumination and the various photosensors.

Figure 1:
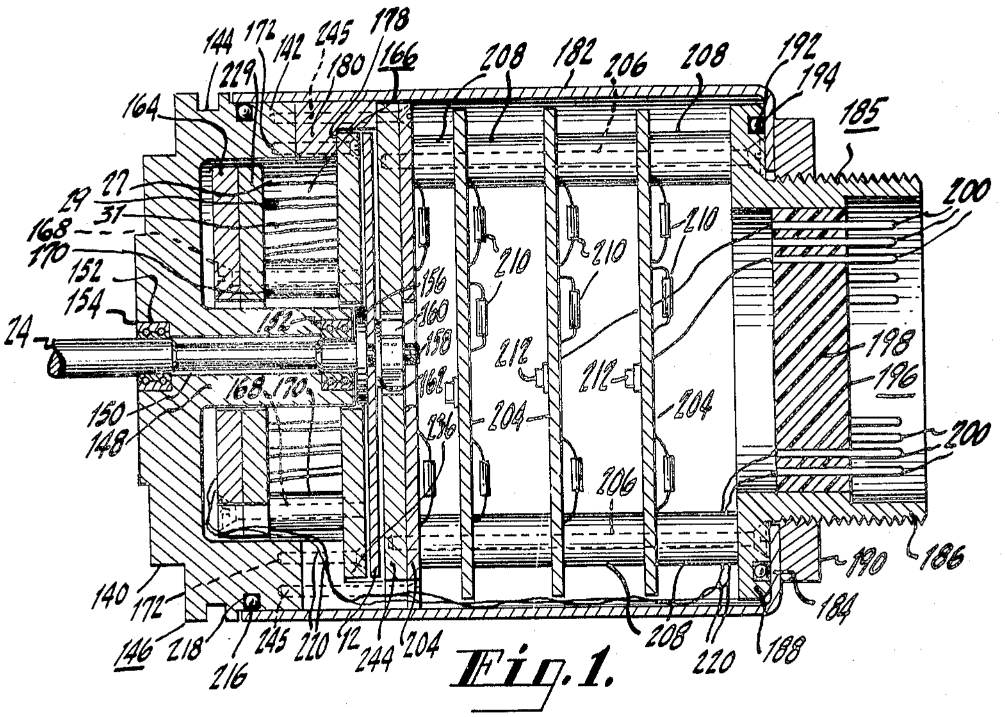
FIG. 1 is a longitudinal section of apparatus embodying this invention.

A suitable arrangement of the encoder apparatus 146 is shown in FIGS. 1–5. In FIG. 1 a cylindrical cup-shaped cap 140 is provided. This cap has a reduced diameter portion 142 at the right end thereof as viewed in FIG. 1 and a groove 144 in the larger diameter outer surface. The groove may be used for mounting the encoder 146 on a mounting. A spacer 180, comprising a large sector of a cylinder, having an outside diameter equal to the reduced outside diameter of the cap 140, and so mounted that its open portion faces downwards as viewed in FIG. 1, is positioned concentric with the right end of the cap 140 and in contact therewith. This spacer 180 has a portion providing a shoulder 178 facing to the right as viewed in FIG. 1.

The cap 140 has a centrally arranged axially extending pedestal 148 therein, there being a cylindrical hole 150 through pedestal 148. The ends 152 of the hole are enlarged and anti-friction bearings 154 are provided, one in each of the enlarged hole portions 152. A shaft 24 extends through the hole 150 and is mounted for rotation in the anti-friction bearings 154. This shaft 24 has an enlarged disk 156 integral with one end thereof and a reduced threaded extension 158 extending from the disk 156 and in axial alignment with the shaft 24. The code disk 12, such as the one shown in FIG. 6 but which may have more code rings thereon, is fixed on extension 158 and is held against disk 156 by nut 160 and lock washer 162. In smaller devices of this nature, the extension 158 may be omitted and code disk 12 may be fixed to disk 156 as by an epoxy bond. A lamp plate 164 (further described below) and a fiber optical converter 166 are positioned in cap 140 surrounding pedestal 148. The converter 166 comprises plates 229 and 236 held in spaced relation as will be explained below. The lamp plate 164 is mounted on the fiber optical converter 166 by means of bolts 168 threaded into plate 236. A spacer 170 separates plates 229 and 236. The lamp plate 164 and fiber optical converter 166 as an assembly is mounted on the cap 140 by means of screws 172 threaded into cup 140 and extending through spacer 180 and holding plate 236 against shoulder 178.

A photosensor plate 244 (described below) and a plurality of circuitry support boards 204 are supported by bolts 206 extending through a flange 188 of a socket support 185 (to be described) and threaded into the photodiode plate 244. Spacers 208 are provided between the flange 188 and one circuitry support board 204 and between each circuitry support board 204 and the near one thereto. The circuitry support board 204 adjacent the photosensor plate 244 has a hole therethrough to provide clearance for nut 160 and threaded shaft extension 158. This circuit support plate 204 may have a gap at the lower part thereof as viewed in FIG. 1 to permit passage of wires. Circuit elements comprising resistors 210 and transistors 212 are mounted on the circuit support plate. The photosensor plate 244 and the element mounted thereon may be mounted on cup 140 by screws 245 extending through spacer 180 and threaded into cup 140.

A cylindrical housing 182 has an inside diameter of one end thereof to closely fit the outside diameter of the right end 142 of the cap 140 and the spacer 180. This housing 182 has an inturned flange 184 at the end thereof opposite the end that fits cap 140. The socket support 185, comprising a cylindrical portion 186, with which the radially extending flange 188 is integral, extends through the hole at the flanged end 184 of the housing 182, the flange 188 of the support contacting the inner surface of the inturned flange 184. The external surface of the cylindrical portion 186 of the socket support 185 is threaded and a nut 190 is tightened down on the outside of the inturned flange 184 to hold it against the flange 188 of the socket support. If desired, an axially extending circular groove 192 may be provided in the contacting surface of flange 184 to receive a resilient O-ring 194 for hermetic sealing of the socket support to the housing 182, and an O-ring 216 may be provided in a groove 218 in the outer surface of the reduced portion 142 of the cup 140 to complete hermetic sealing of the assembled encoder apparatus 146.

A socket 196 comprising an insulating body 198 and conductive pins 200 extending in an axial direction through the body 198, is provided in the socket support and is supported thereby.

As noted, wires 220 from the light plate 164 run therefrom through the gap in the spacer ring 180 and through the gaps in plates 244 and 204 to the appropriate pins 200 in the socket 196 or to the appropriate connections on the circuitry support boards 204, and from each of the circuit support boards 204 to their appropriate pins 200.

Figure 2:
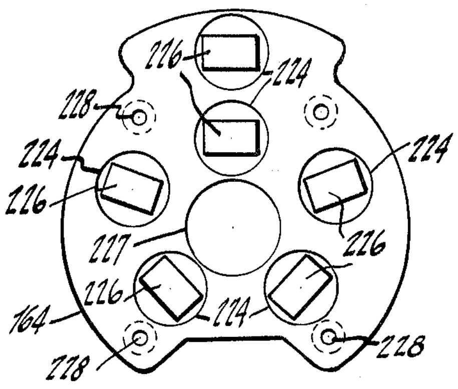
FIGS. 2–5 are plan views of various elements of the apparatus of FIG. 1.

The details of the lamp plate 164 is explained in connection with FIG. 2. This lamp plate 164 comprises a disk having four mounting holes 228 for receiving support bolts 168 of FIG. 1. The holes 228 are counter bored at the back side of the plate 164 as viewed in FIG. 2, that is, the left side as viewed in FIG. 1, to receive the heads of the assembly screws 168. A plurality, here shown as six, holes 224 are provided in conveniently spaced positions part-way through plate 164 and reflectors 226 containing light bulbs, such as "grain of wheat" bulbs are held in each hole in any convenient manner. A hole 227 is provided through plate 164 for receiving the pedestal 148. The lower radially extending edges of the plate as viewed in FIG. 2 are cut away as shown to provide passage for wires 220 (FIG. 1).

Figure 3:
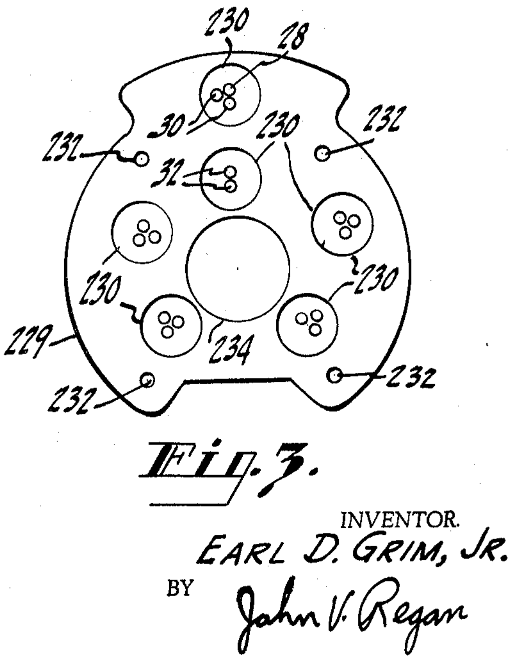

FIG. 3 shows plate 229 comprising the left end of the fiber optical converter, as viewed in FIG. 1, that is, the end of the fiber optical converter 166 that is adjacent the lamp plate 164. Holes 230 are bored in plate 229, a little smaller in diameter but in registering position with respect to the holes 224 in plate 164. The round ends (such as 28, 30, 30) of several, here shown as three, fiber optical bundles (such as 27, 29, 29 of FIGS. 7 and 9) in a plastic matrix, end flush with the surface of plate 229 in each of holes 230, while two bundles such as 32, 32 of FIGS. 7 and 9 in their matrix extend through their hole 230. Thereby 17 fiber optical bundles are provided. Each fiber optical bundle end may be in registry with a light bulb contained in reflectors 226. Since each fiber optical bundle should receive light from its registering light source only, light shields may be applied around each bulb to prevent light from a bulb from illuminating any fiber optical bundle except the one in registry therewith. Mounting holes 232 in registry with mounting holes 228 of lamp plate 164, extend through plate 229 and a hole 234 is provided in the center thereof to receive the pedestal 148. The radial edges of plate 229 correspond in shape to the edges of plate 164.

FIG. 4 shows the side plate 236 of the fiber optical converter 166 that is adjacent the code wheel 12 in the arrangement of FIG. 1. The plate 236, comprising the right end of fiber optical converter 166 as viewed in FIG. 1, is round and has a diameter sufficiently great to fit against shoulder 178 (FIG. 1). Six mounting holes 179 are provided to receive screws 172. A hole 238 for the pedestal 148 is provided through the middle of the plate 236 and threaded mounting holes 240 are provided in registry with the mounting holes of plates 164 and 229 to receive screws 168. If desired, one or more alignment pin holes may be provided.

As indicated in FIG. 1, fiber optical bundles such as 27, 29, 29, 31, 31 of FIGS. 7 and 9, extend from plate 229 to plate 236. The position and shape of one end, the light input end, of each fiber bundle is shown and has been described in connection with FIG. 3. FIG. 4 shows the position and shape of the other end, the light output end, of the fiber optical bundles. One fiber optical bundle end 28 is positioned to throw light on the outside code track or ring 14 of coded disk 12. This fiber optical bundle end 28 is of rectangular shape and of the circumferential width of or of slightly less width than the circumferential width of a segment of code track 14. This fiber optical bundle end 28 extends radially and may be a little longer than the radial width of the code track 14 with which it is associated since the outer end of the rectangle may be off the code disk 12. The radially extending ends fo the second 30, 30, third 32, 32, fourth 34, 34, and fifth 36, 36 pairs of fiber optical bundle ends illuminate the second 16, third 18, fourth 20 and fifth 22 code track in the V-scan manner, as described above. The fifth 36, 36 and successive pairs of fiber optical bundle ends may be made shorter and wider than other bundle ends or even round, since the sectors of their corresponding code tracks are wider than the sectors of prior tracks. The sixth 37, 37, seventh 38, 38, and eighth 39, 39 pairs of fiber optical bundle ends may be rectangular and their long dimension may extend at right angles to radii through them, each pair of bundles illuminating its respective track (not shown). As stated above, if space requirements so dictate, the ends of the bundles of any pair (or pairs) of bundles may each be displaced angularly one sector and may illuminate the next sectors to the sectors normally illuminated in accordance with the V-scan.

The face of the photosensor plate 244 adjacent the code disk 12, that is, the left face as viewed in FIG. 1, is shown in FIG. 5. The plate 244 is round, is larger in diameter than plate 236, and has a central hole 246 to receive the nut 160 on shaft extension 158 and has a cut out in the bottom to allow the wires 220 to run to the light plate. Four threaded mounting holes 248 are provided to receive mounting bolts 206. A plurality of holes 250 are bored into the face of disk in registry with holes 237 in plate 236. A photosensor such as 50, 52—52, and 54—54 of FIGS. 7 and 8 is positioned in each of these holes 237. These photosensors are positioned and oriented to receive light from the corresponding fiber optical bundle end when not occulted by an opaque sector of a code ring. Mounting holes 247 may be provided to receive screws 245.

The above-described structure does not include fiber optical bundles leading from the coded disk to the corresponding photosensor. If desired, such fiber optical bundles may be provided, and in such case, one end of each of the fiber optical bundles would be positioned in a support plate in an array similar to that shown in FIG. 4. The other ends of each fiber optical bundles would be positioned to illuminate a respective photosensor positioned and supported in any convenient manner.

In one practical embodiment of this invention an encoder has been built which is about 2½ inches in diameter, about 3¼ inches long, weighs about 9 ounces and has a resolution as high as 9 bits per revolution, its output being in natural binary code and in complementary binary code. This encoder contains all elements necessary for operation thereof except the sources of potential.

What is claimed is:

1. Electro-optical apparatus for representing the angular position of a rotatable shaft as a natural binary digital quantity comprising:
- a disk fixed for rotation on a shaft,
- said disk having a plurality of concentric tracks thereon,
- each of said tracks having alternately arranged transparent and opaque sections,
- means for applying light to one side of said disk and onto one track,
- a photosensor arranged to pick up light that passes through said one track,
- a modified flip-flop circuit having two output circuits each having a light source therein and an input connection,
- said photosensor being connected to said input connection,
- one of said light sources being on and the other of said light sources being off in response to a lack of input to said modified flip-flop circuit,
- the other of said light sources being on and the one light source being off in response to an input from the said photosensor to said modified flip-flop circuit,

- the light from said light sources being applied to separated points on a further track,
- photosensors arranged to receive light that passes through said further track,
- a further modified flip-flop circuit,
- and means for connecting said photosensors to the input connection of said further modified flip-flop circuits.

2. Electro-optical apparatus for representing the angular position of a rotatable shaft as a natural binary digital quantity comprising:
- a disk fixed for rotation on a shaft,
- said disk having a plurality of concentric tracks thereon,
- each of said tracks having alternately arranged transparent and opaque sections,
- fiber optical bundles for applying light to one side of said disk and onto one track,
- a photosensor arranged to pick up light that passes through said one track,
- a modified flip-flop circuit having two output circuits each having a light source therein and an input connection,
- said photosensor being connected to said input connection,
- one of said light sources being on and the other of said light sources being off in response to a lack of input to said modified flip-flop circuit,
- the other of said light sources being on and the one light source being off in response to an input from the said photosensor to said modified flip-flop circuit,
- the light from said light sources being applied to separated points on said track,
- fiber optical bundles for applying the light from said light sources to separated points on said track,
- photosensors arranged to receive light that passes through said further track,
- a further modified flip-flop circuit,
- and means for connecting said photosensors to the input connection of said further modified flip-flop circuits.

3. Electro-optical apparatus for representing the angular position of a rotatable shaft as a natural binary digital quantity comprising:
- a disk fixed for rotation on a shaft,
- said disk having a plurality of concentric tracks thereon,
- each of said tracks having alternately arranged transparent and opaque sections,
- means for applying light to one side of said disk and onto one track,
- a photosensor arranged to pick up light that passes through said one track,
- a modified flip-flop circuit having two output circuits each having a light source therein and an input connection,
- said photosensor being connected to said input connection,
- one of said light sources being on and the other of said light sources being off in response to a lack of input to said modified flip-flop circuit,
- the other of said light sources being on and the one light source being off in response to an input from the said photosensor to said modified flip-flop circuit,
- the light from said light sources being applied to separated points on a further track,
- photosensors arranged to receive light that passes through said further track,
- a further modified flip-flop circuit,
- and means for connecting said photosensors to the input connection of said further modified flip-flop circuit,
- said modified flip-flop circuits each having two output circuit connections, one of said output connections indicating whether or not input is applied to the input connection of the respective modified flip-flop circuit and the other of the two output connections providing a complementary indication.

4. Electro-optical apparatus for representing the angular position of a rotatable shaft as a natural binary digital quantity comprising:
a disk fixed for rotation on a shaft,
said disk having a plurality of concentric tracks thereon,
each of said tracks having alternately arranged transparent and opaque sections,
fiber optical bundles for applying light to one side of said disk and onto one track,
a photosensor arranged to pick up light that passes through said one track,
a modified flip-flop circuit having two output circuits each having a light source therein and an input connection,
said photosensor being connected to said input connection,
one of said light sources being on and the other of said light sources being off in response to a lack of input to said modified flip-flop circuit,
the other of said light sources being on and the one light source being off in response to an input from the said photosensor to said modified flip-flop circuit,
the light from said light sources being applied to separated points on said further track,
fiber optical bundles for applying the light from said light sources to separated points on said track,
photosensor arranged to receive light that passes through said further track,
a further modified flip-flop circuit,
and means for connecting said photosensors to the input connection of said further modified flip-flop circuit,
said modified flip-flop circuits each having two output circuit connections,
one of said output connections indicating whether or not input is applied to the input connection of the respective modified flip-flop circuit and the other of the two output connections providing a complementary indication.

5. Electro-optical apparatus for representing the angular position of a rotatable shaft as a natural binary digital quantity comprising:
a disk fixed for rotation on a shaft,
said disk having a plurality of concentric tracks thereon,
each of said tracks having alternately arranged transparent and opaque sections,
means for applying light to one side of said disk and onto one track,
a photosensor arranged to pick up light that passes through said one track,
a modified flip-flop circuit having two output circuits each having a light source therein and an input connection,
said photosensor being connected to said input connection,
one of said light sources being on and the other of said light sources being off in response to a lack of input to said modified flip-flop circuit,
the other of said light sources being on and the one light source being off in response to an input from the said photosensor to said modified flip-flop circuit,
the light from said light sources being applied to separated points on a further track,
photosensor arranged to receive light that passes through said further track, a further modified flip-flop circuit,
and means for connecting said photosensors to the input connection of said further modified flip-flop circuit,
the light source from said further modified flip-flop circuit being applied to separated points on a still further track,
the light that passes through said still further track being applied to respective further photosensors,
and the photosensor being connected in parallel to still a further similar modified flip-flop circuit input connection,
the distance between the point of application of light to one of said tracks being equal to the circumferential length of an even number of sectors of said track,
said modified flip-flop circuits each having two output connections one of said output connections indicating whether or not input is applied to the input connection of the respective modified flip-flop circuit,
and the other of the two output connections providing a complementary indication,
the connection of the indication and of the complementary indication being reversed for the modified flip-flop circuit to the input of which the photosensors are connected to which is applied light passing through said last-mentioned track.

6. Electro-optical apparatus for representing the angular position of a rotatable shaft as a natural binary digital quantity comprising a disk fixed for rotation on a shaft,
said disk having a plurality of concentric tracks thereon,
each of said tracks having alternately arranged transparent and opaque sections,
fiber optical bundles for applying light to one side of said disk and onto one track,
a photosensor arranged to pick up light that passes through said one track,
a modified flip-flop circuit having two output circuits each having a light source therein and an input connection,
said photosensor being connected to said input connection,
one of said light sources being on and the other of said light sources being off in response to a lack of input to said modified flip-flop circuit,
the other of said light sources being on and the one light source being off in response to an input from the said photosensor to said modified flip-flop circuit,
the light from said light sources being applied to separated points on a further track,
fiber optical bundles for applying the light from said light sources to separated points on said track,
photosensor arranged to receive light that passes through said further track,
a further modified flip-flop circuit,
and means for connecting said photosensors to the input connection of said further modified flip-flop circuit,
the light source from said further modified flip-flop circuit being applied to separated points on a still further track,
the light that passes through said still further track being applied to respective further photosensors,
and the photosensor being connected in parallel to still a further similar modified flip-flop circuit input connection,
the distance between the point of application of light to one of said tracks being equal to the circumferential length of an even number of sectors of said track,
said modified flip-flop circuits each having two output connections one of said output connections indicating whether or not input is applied to the input connection of the respective modified flip-flop circuit, and the other of the two output connection providing a complementary indication, the connection of the indication and of the complementary indication being reversed for the modified flip-flop circuit to the input of which the photosensors are connected to which is applied light passing through said last-mentioned track.

References Cited by the Examiner

UNITED STATES PATENTS

| | | | |
|---|---|---|---|
| 2,930,033 | 3/1960 | Webb | 340—347 |
| 3,054,098 | 3/1960 | Jacoby | 340—347 |
| 3,060,328 | 10/1962 | McMillian | 307—88.5 |
| 3,066,231 | 11/1962 | Slobodzinski et al. | 307—88.5 |

OTHER REFERENCES

IBM Technical Disclosure Bulletin, vol. 4, No. 7, page 85, December 1961.

Notes on Analog-Digital Conversion Techniques, Alfred K. Susskind, pages 6–40 thru 6–55, 1957.

MALCOLM A. MORRISON, *Primary Examiner.*